US005726372A

United States Patent [19]

Eventoff et al.

[11] Patent Number: 5,726,372

[45] Date of Patent: Mar. 10, 1998

[54] NOTE ASSISTED MUSICAL INSTRUMENT SYSTEM AND METHOD OF OPERATION

[75] Inventors: Franklin N. Eventoff, 7086 Atwood Rd., Ferndale, Wash. 98248; Bernard Mohrbacher, Santa Barbara, Calif.

[73] Assignee: Franklin N. Eventoff, Ferndale, Wash.

[21] Appl. No.: 569,548

[22] Filed: Dec. 8, 1995

Related U.S. Application Data

[63] Continuation of Ser. No. 338,980, Nov. 14, 1994, abandoned, which is a continuation of Ser. No. 46,277, Apr. 9, 1993, abandoned.

[51] Int. Cl.[6] .......... G09B 15/04; G10H 1/26; G10H 1/38; G10H 1/46

[52] U.S. Cl. .......... 84/609; 84/613; 84/633; 84/477 R; 84/DIG. 22

[58] Field of Search .......... 84/601, 602, 609, 84/610, 634, 635, 462, 613, 633, 637, DIG. 22, 477 R

[56] References Cited

U.S. PATENT DOCUMENTS

| | | | |
|---|---|---|---|
| Re. 32,862 | 2/1989 | Wachi | 84/1.21 |
| 197,648 | 11/1877 | McChesney et al. . | |
| 2,253,782 | 8/1941 | Hammond et al. | 84/423 |
| 2,557,690 | 6/1951 | Reuther | 84/423 |
| 2,611,291 | 9/1952 | Heim | 84/427 |
| 4,442,486 | 4/1984 | Mayer | 364/200 |
| 4,454,594 | 6/1984 | Heffron et al. | 364/900 |
| 4,462,076 | 7/1984 | Smith, III | 364/200 |
| 4,644,840 | 2/1987 | Franz et al. | 84/1.01 |
| 4,658,695 | 4/1987 | Cutler | 84/424 |
| 4,686,880 | 8/1987 | Salani et al. | 84/1.01 |
| 4,748,887 | 6/1988 | Marshall | 84/1.15 |
| 4,771,671 | 9/1988 | Hoff, Jr. | 84/1.01 |
| 4,777,857 | 10/1988 | Stewart | 84/1.01 |
| 4,794,838 | 1/1989 | Corrigau, III | 84/1.01 |
| 5,005,461 | 4/1991 | Murata | 84/646 |
| 5,009,145 | 4/1991 | Ishida et al. | 84/612 |
| 5,062,097 | 10/1991 | Kumaoka | 84/645 |
| 5,074,182 | 12/1991 | Capps et al. | 84/609 |
| 5,092,216 | 3/1992 | Wadhams | 84/602 |
| 5,099,738 | 3/1992 | Hotz | 84/617 |
| 5,111,727 | 5/1992 | Rossum | 84/603 |
| 5,138,925 | 8/1992 | Koguchi et al. | 84/609 |
| 5,140,887 | 8/1992 | Chapman | 84/646 |
| 5,208,421 | 5/1993 | Lisle et al. | 84/645 |
| 5,262,583 | 11/1993 | Shimada | 84/609 |
| 5,262,584 | 11/1993 | Shimada | 84/609 |
| 5,278,346 | 1/1994 | Yamaguchi | 84/609 |
| 5,313,011 | 5/1994 | Koguchi | 84/609 |
| 5,396,828 | 3/1995 | Farrand | 84/462 |
| 5,453,569 | 9/1995 | Saito et al. | 84/609 |
| 5,466,882 | 11/1995 | Lee | 84/603 |

FOREIGN PATENT DOCUMENTS

| | | | |
|---|---|---|---|
| 0 248 438 | 8/1988 | Japan . | |
| WO 87/00330 | 1/1987 | United Kingdom | 1/34 |
| WO 91/11691 | 8/1991 | WIPO . | |

OTHER PUBLICATIONS

Author Unknown, The MIDIKeys Window, Chapter 20: Reference, p. 331.

Starr Switch Company, "ZTAR, MIDI Fingerboard Controllers" Starr Instruments brochure, 1993.

Author Unknown, "Atari Unveils First Musical Instrument", News Article Unknown, Feb.–Mar. 19xx, pp. 1 & 22.

Hotz Instrument Technology Systems, Product Summary, Hotz Instrument Technology, 11835 W. Olympic Blvd., W. Los Angeles, CA 90064.

(List continued on next page.)

*Primary Examiner*—Stanley J. Witkowski

*Attorney, Agent, or Firm*—Seed and Berry LLP

[57] ABSTRACT

A music system including a musical instrument, such as a keyboard strummer, in which the musical notes produced by the playing of the instrument are controlled by musical assistance data mapped unto the instrument keys and strum vanes from tracks specially prepared and synchronized with a prior performance of the piece.

22 Claims, 5 Drawing Sheets

OTHER PUBLICATIONS

Mard Naman, "Jimmy Hotz's MIDI Magic", START The ST Monthly, Apr. 1989, pp. 21–26.

Halaby et al, "The MIDIKeys Window", Visions, Professional Sequencing Software, 1989, Chapter 20, p. 331, published by OPCode Systems, Menlo Park, CA.

"Atari Unveils First Musical Instrument", The Music and Sound Retailer, Feb.–Mar. 1988, pp. 1 & 22.

Serge Modular Musical Systems, San Francisco, "The Magic Band" and Playing Band From Power–On to Power Off, 1983.

Suzuki Corporation,"Omnichord System 100, System 200m Operation Manual", 1990.

Hotz Instrument Technology Systems, Product Summary, 1988, Instrument Technology, Los Angeles, CA 90064.

"ZTAR MIDI Fingerboard Controllers," Starr Instruments, Starr Switch Co., San Diego, CA, 1993.

Naman, Mard, "Jimmy Hotz's MIDI Magic," *Start The ST Monthly* 8(9):21–26, Apr. 1989.

NOTE ASSISTED MUSICAL INSTRUMENT SYSTEM AND METHOD OF OPERATION

This is a continuation of application Ser. No. 08/338,980 filed on Nov. 14, 1994, now abandoned, which is a continuation of application Ser. No. 08/046,277 filed on Apr. 9, 1993, now abandoned.

BACKGROUND OF THE INVENTION

1. Field of the Invention

This invention relates to techniques for producing music, and, in particular, to polyphonic electronic musical instruments and related systems.

2. Description of the Prior Art

Musical instrument designs range from conventional instruments played by hand, such as a violin or electric guitar, to pre-programmed instruments, such as player pianos, to programmable instruments such as keyboard synthesizers. The level of skill required to produce music with non-programmed hand instruments may be very high and requires a substantial investment of time and effort, while the quality of the music produced by pre-programmed or programmable instruments often lacks some of the human individuality that makes music so pleasurable.

What are needed are techniques for producing music which retain more of the human individuality of non-programmed instruments while reducing the level of skill and investment needed to produce, or re-produce, music which retains a high level of the human individuality qualities of music produced with more conventional instruments.

SUMMARY OF THE INVENTION

In accordance with the present invention, methods and systems are provided for producing music retaining a substantial level of the individuality achievable with non-programmed instruments while reducing the level of skill and investment required to produce such high quality music by partially programming the instrument in accordance with a pre-recorded performance. In particular, a performance by a popular musician may be recorded, for example, as a music video and encoded with musical note assistance data synchronized with the music video so that a musician or student with comparatively less skill and experience may produce a relatively high quality individualistic rendition of the original performance on a specially designed musical instrument partially programmed by the encoded musical note assistance data.

In overview, the present invention therefore provides musical note assistance data serially encoded by a studio musician in multiple tracks in response to a live performance. The encoded data is provided to a specially configured musical instrument which is programmed by the encoded data synchronously with the presentation of the performance to a student musician who plays along with the performance by stroking and strumming keys and vanes of the instrument. That is, the musical note assistance data is used to map predetermined values or ranges of values to the keys and other input devices of the instrument being played synchronously with the presentation of the pre-recorded performance. The stroking and strumming is decoded by a microprocessor which produces notes in which some of the musical qualities such as scale and chord are determined by the musical assistance data provided by the studio musician while other musical qualities such as the particular note within the scale or chord, as well as other note qualities such as loudness, degree of bending, and after-touch, are determined by the manner in which the student musician plays the instrument. In a preferred embodiment, the instrument includes a keyboard section, a strummer section and a set of programming function keys for further controlling the operation of the microprocessor which creates the music in response to the playing of the instrument and the synchronized musical note assistance data.

The instrument is played by stroking and strumming mechanical input devices which respond to the musician's touch thereby providing mechanical feedback or "feel" to the musician playing the instrument.

In a first aspect, the present invention provides method and apparatus for producing music from a plurality of input keys, or other means, each responsive to activation by a musician for producing individual music related output signals, time varying music note assistance data synchronized with portions of a musical piece, and means for mapping portions of the music note assistance data to each of the plurality of input means to affect musical qualities of the music related output signals produced by activation of each of the plurality of input keys in a time varying manner synchronized with said musical piece.

These and other features and advantages of this invention will become further apparent from the detailed description that follows which is accompanied by drawing figures. In the figures and description, reference numerals indicate various features of the invention, like numerals referring to like features throughout both the drawing figures and the description.

DETAILED DESCRIPTION OF THE PREFERRED EMBODIMENT(S)

Figure 1:
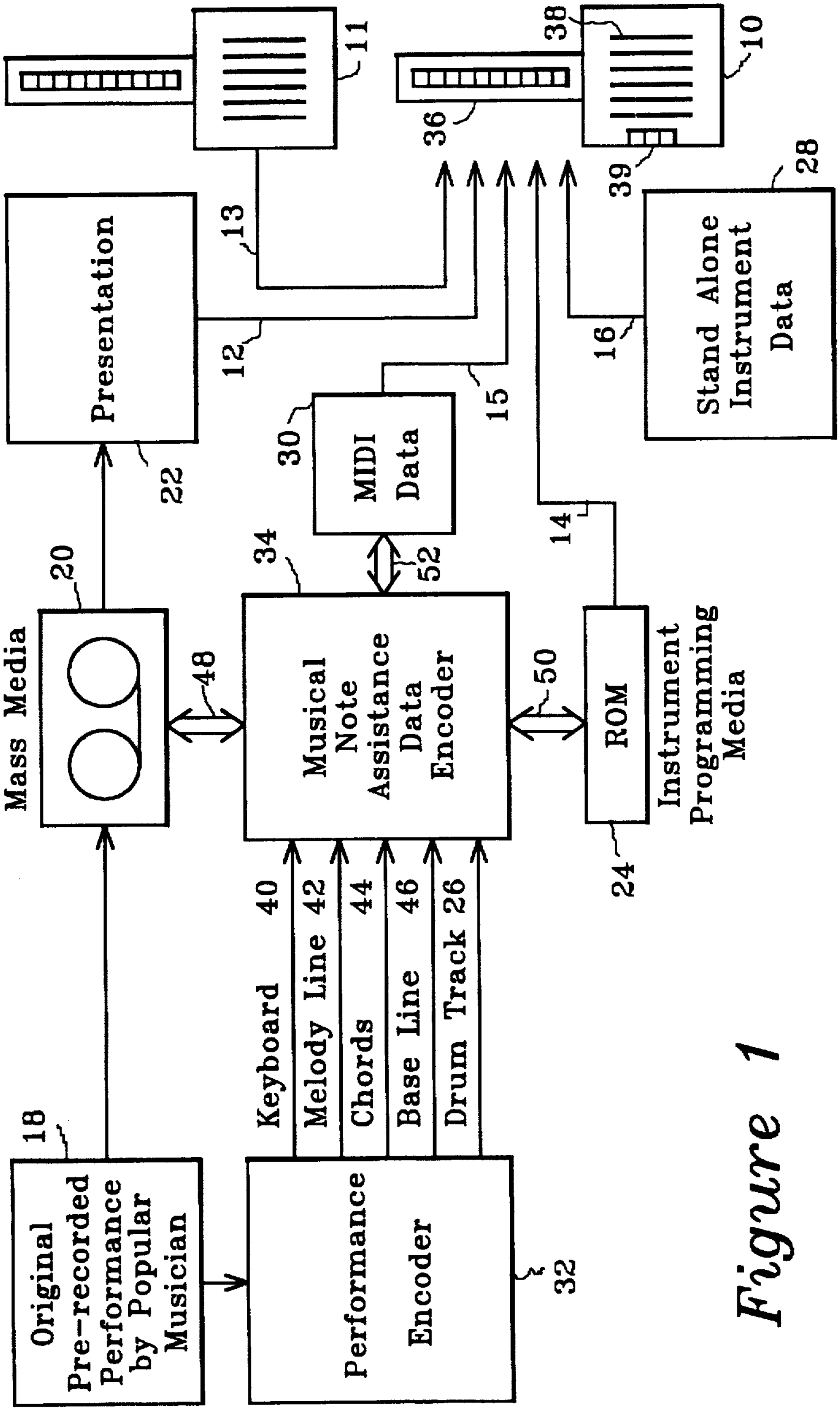
FIG. 1 is a block diagram overview of the operation of the present invention in which musical note assistance data is encoded from a pre-recorded performance and decoded for later use in configuring the response of a compatible musical instrument, such as the keyboard/strummer shown.

Referring first to FIG. 1, a block diagram overview of the present invention is shown in which a special purpose musical instrument, such as keyboard/strummer 10, is partially preprogrammed for playing in a mass media mode by mass media input 12, or in a specialized media mode by specialized media input 14, MIDI data input 15 or network input 13, or in a stand alone performance mode by stand alone programming input 16. In these modes specially encoded, musical note assistance data from pre-recorded performance 18 is provided to keyboard/strummer 10 by inputs 12, 13, 14, 15, or 16.

With regard first to the mass media mode, musical note assistance data encoded on mass media 20 is provided to keyboard/strummer 10 by means of mass media input 12. Pre-recorded performance 18 is reproduced in a conventional manner on mass media 20, which may be an audio or video cassette, a CD ROM or other conveniently distributable media. Alternatively, mass media 20 may be the transmission by broadcast media of a music data performance, such as a TV broadcast of a conventional or special purpose music television program. Mass media 20 is played—or displayed—on a suitable presentation device, such as mass media player 22, which may be a TV receiver or a VCR player or an audio cassette player system or similar device, depending on the type of media represented by mass media 20.

When pre-recorded performance 18 is presented on mass media player 22, musically encoded data added to mass media 20 is provided by means of mass media input 12 to keyboard/strummer 10 to partially pre-program keyboard/strummer 10 so that the instrument may be played simultaneously with the reproduced performance. As will be described below in greater detail, mass media input 12 causes the response of keyboard/strummer 10 to be musically consistent with pre-recorded performance 18 being watched by the person playing the instrument. For a simple example, a particular key or other input device of keyboard/strummer 10 may be programmed by mass media input 12 so that when the reproduced performance included a note played in the C major scale, the appropriate key was preprogrammed to respond in that scale when played. Thereafter, during the same performance, a note played in the F major scale would be used to program the same key on the instrument to respond in that scale.

With regard to the other musical note assistance data inputs, such as network input 13, specialized media input 14, MIDI data input 15, and stand alone programming input 16, the musical note assistance data is provided to keyboard/strummer 10 so that the instrument may be played in a performance separate from a reproduction of pre-recorded performance 18. That is, when musical note assistance data is provided to keyboard/strummer 10 by means of mass media input 12, the instrument is played by a person while that person is observing the reproduction of pre-recorded performance 18. However, when musical note assistance data is provided to keyboard/strummer 10 by another input, such as specialized media input 14, the instrument will probably be played without observing a reproduction of pre-recorded performance 18 although there is nothing in the present invention to prevent observing pre-recorded performance 18 at that time if desired.

In order to synchronize playing of keyboard/strummer 10 without observing pre-recorded performance 18, it is convenient to provide a metronomic beat such as live drum track 26, as will be described below with regard to ROM pack 24 and specialized media input 14.

With regard now to network input 13, musical note assistance data provided by any input to an instrument, such as keyboard/strummer 10, may be re-applied therefrom to another similar instrument by means of a simple network connection. For example, musical note assistance data applied, by means not shown, to keyboard/strummer 11 may be re-applied by network input 13 directly to keyboard/strummer 10 so that both instruments are programmed synchronously from the same musical note assistance data.

With regard now to specialized media input 14, which may conveniently provide musical note assistance data to keyboard/strummer 10 in the form of data from a specialized instrument programming media such as ROM pack 24, the same encoded musical note assistance data is provided to keyboard/strummer 10 as is provided by mass media input 12, but without the simultaneous reproduction of pre-recorded performance 18. That is, when keyboard/strummer 10 is controlled by means of mass media input 12, the person playing keyboard/strummer 10 observes the performance of pre-recorded performance 18 by means of mass media player 22. When keyboard/strummer 10 is controlled by means of specialized media input 14, the person playing keyboard/strummer 10 does not observe the performance of pre-recorded performance 18 and therefore requires some other mechanism for synchronization with the pre-recorded performance. For this reason, it is convenient to provide an audible metronome in the form, for example, of live drum track 26 which is added to ROM pack 24 during the musical data encoding operation described in greater detail herein below.

With regard now to MIDI data input 15, musical note assistance data may be provided to keyboard/strummer 10 in a standard format, such as the MIDI format presently used with most musical keyboard synthesizers. Musical equipment using standard format musical data, such as MIDI equipment 30, may provide musical note assistance data in MIDI format while also providing other data, for the same or similar purposes. For example, MIDI equipment 30 may be a Karioke machine used to display textual data for singing along with pre-recorded performance 18 while providing musical note assistance data in MIDI format so that keyboard/strummer 10 may also be played along with a reproduction of pre-recorded performance 18.

With regard now to the stand alone programming mode, keyboard/strummer 10 may be played without external input, but still obtain musical note assistance for playing in the stand alone mode by means of stand alone instrument data 28 provided by stand alone programming input 16. In the stand alone mode, as is true for many conventional non-electronic instruments, activation of certain sets of instrument keys programs the response of other keys to such activation. That is, keyboard/strummer 10 is partially programmed by the player during the performance in the same general way that an autoharpist or guitar player programs the response of the strummed strings by the manner and timing with which the fret is fingered.

In the preferred embodiment shown in FIG. 1, musical note assistance data is derived from pre-recorded performance 18 by a studio musician during a performance encoding session using performance encoder 32. Performance encoder 32 may operate in a preprogrammed manner by applying predetermined algorithms to pre-recorded performance 18, but it is presently believed that the best quality final programming of keyboard/strummer 10 is accomplished by performance encoding by a live musician.

To encode pre-recorded performance 18 by means of performance encoder 32, the studio musician listens to and/or watches pre-recorded performance 18 to record additional tracks of music then encoded by musical note assistance data encoder 34 as described in greater detail below with regard to FIG. 2. Although the particular additional tracks to be recorded by means of performance encoder 32 may depend upon the type of instrument to which the musical note assistance data will be applied, the following generalized description of the tracks to be recorded for the embodiment shown in FIG. 1 will provide sufficient information so that variations of the tracks may easily be derived for specific applications.

During performance encoding, four tracks of musical data are produced by performance encoder 32 for use in creating musical note assistance data in musical note assistance data encoder 34 to be recorded as musical note assistance data 48 with pre-recorded performance 18 on mass media 20 or separately as musical note assistance data 50 in ROM pack 24 or as MIDI format musical note assistance data 52 in MIDI equipment 30. These four tracks are shown in FIG. 1 as keyboard track 40, melody line 42, chords 44 and base line 46. As noted above, when the musical note assistance data is used in keyboard/strummer 10 without an observable, simultaneous reproduction of pre-recorded performance 18, such as when keyboard/strummer 10 is provided with specialized media input 14 from ROM pack 24 or MIDI data input 15 from MIDI equipment 30, it is advantageous to provide a metronomic beat for synchronizing the playing of keyboard/strummer 10 by providing an additional track in the form of live drum track 26.

The four or five tracks to be produced by performance encoder 32 may conveniently be produced serially. That is, the studio musician, after becoming sufficiently familiar with pre-recorded performance 18, first records one track such as keyboard track 40 while listening to pre-recorded performance 18. Thereafter, the studio musician then replays pre-recorded performance 18 each time an additional track is recorded.

In the embodiment shown, the musical note assistance data is applied to keyboard/strummer 10 which includes keyboard section 36, strummer 38 and function programming keys 39. Keyboard section 36 is a multi-octave keyboard, strummer 38 represents the equivalent of a six stringed instrument for strumming, such as the strummable section of a guitar, while function programming keys 39 are used to further control the programming and operation of instrument microprocessor 108 shown in FIG. 3. Function programming keys 39 may include conventional keyboard keys for data entry for user programming input as well as proportional input keys, such as rocker keys, in which activation of one part of the key indicates an increase of value while activation of another part of the key indicates a desired decrease in value. For example, a rocker key, not shown, could be dedicated for use primarily for volume control so that pressure on the upper part of the key increased volume while pressure on the lower part of the key would decrease volume. Similar keys, such as additional rocker keys, could be used for varying musical effects during the performance such as tremolo.

Conventional musical instruments, such as keyboard synthesizers, may be modified for use in place or keyboard/strummer 10. The details and operations of such instruments may be understood from the detailed description of portions of the keyboard and strummer input assemblies of keyboard/strummer 10 shown in FIGS. 4 and 5.

With regard now to the use of keyboard track 40 to preprogram the operation of keyboard/strummer 10 as shown in FIG. 1, the musical note assistance data provided by this track is used to select the scale of the keys of keyboard section 36. For example, if pre-recorded performance 18 begins with a bar of music in the C major scale, keyboard track 40 programs keyboard section 36 to represent appropriate octaves of keys in the C major scale. When a musical note is encountered in pre-recorded performance 18 in another scale, such as the F flat major scale, (as what may be called an accidental or occasional note) keyboard track 40 programs keyboard section 36 in that new scale. After the accidental note, if the music returns to the C major scale, keyboard track 40 is then used to return the programming of keyboard section 36 to the C major scale.

In particular, to program keyboard section 36 for a particular scale such as the C major scale, the studio musician would cause keyboard track 40 to include the first seven notes of that scale. The first encoded note is the root note of the scale to be played. The eighth note or octave note is by definition, in Western music, always a repetition of the first note in that scale. The multi-octave keys of keyboard section 36 may therefore be programmed to a particular scale by the playing of seven notes in order in that scale on keyboard track 40 at, or just before, the scale change in pre-recorded performance 18. Thereafter, keyboard track 40 is encoded in musical note assistance data encoder 34 to produce musical note assistance data 48 to be added to prerecorded performance 18 on mass media 20, or to produce musical note assistance data 50 to be applied to ROM pack 24 or to produce musical note assistance data 52 to be applied to MIDI equipment 30.

With regard now to melody line 42 and base line 46, a single note for each line is programmed to represent that track. Each such note may change relatively infrequently during pre-recorded performance 18 so it is only necessary for the studio musician to play the appropriate note during the recording of the tracks for melody line 42 and base line 46 whenever the note changes.

Chord track 44 requires more notes than melody or baseline tracks 42 or 46. In the particular embodiment shown in FIG. 1, keyboard/strummer 10 includes strummer 38 which conveniently includes six playable vanes, one of which is described below in greater detail with regard to FIG. 4. In order to program the six note chord represented by six vane strummer 38, six notes must be played to program chord track 44 whenever the chord in pre-recorded performance 18 changes.

As noted above, live drum track 26 may be programmed only when the note assist data is provided to keyboard/strummer 10 without the simultaneous presentation of pre-recorded performance 18. Live drum track 26 would therefore likely be recorded during the programming of musical note assistance data 50 for ROM pack 24 or MIDI format musical note assistance data 52 for MIDI equipment 30.

In addition to programming the note assistance data, additional data and information may be encoded on playable mass media 20 and/or ROM pack 24 such as automatic queuing data. If, for example, playable mass media 20 is a standard compact disk or CD ROM with a selection of different musical tracks such as songs 1 through 20, the appropriate note assistance data may be encoded on ROM pack 24 as musical note assistance data 50 rather than directly on the CD ROM. In addition, the first few milliseconds of sound at the beginning of each song would also be recorded on ROM pack 24 within musical note assistance data 50 for later use during playing by the student musician as described below with regard to queuing comparator 121 in FIG. 3.

Figure 2:
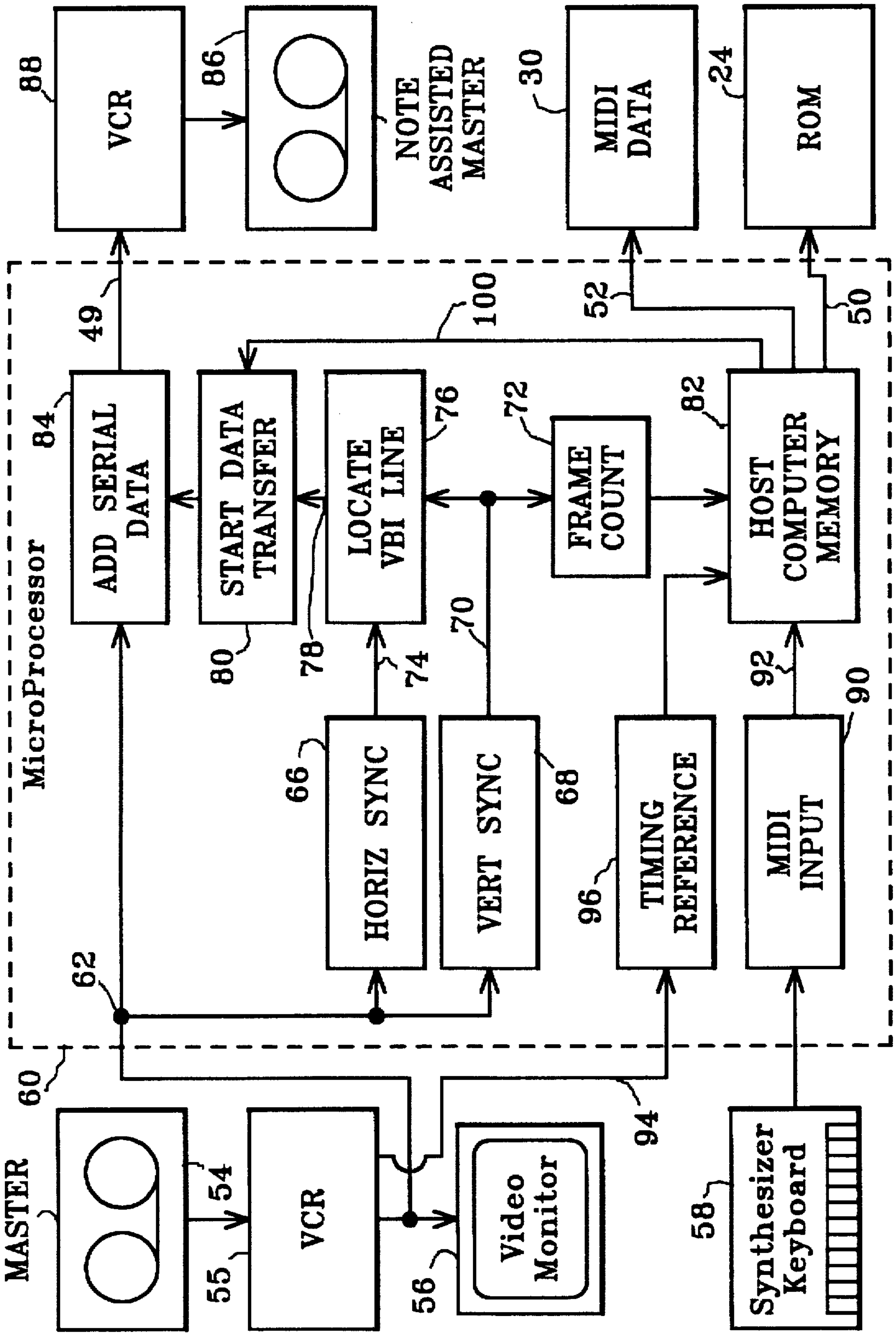
FIG. 2 is a block diagram of the musical note assistance data encoding portion of the present invention shown in FIG. 1.

Referring now to FIG. 2, the encoding of music assistance data will be described in greater detail. An appropriate copy of pre-recorded performance 18 is provided on conventional master 54 which, for the purposes of the following description, is assumed to be a video cassette master of a particular music video performance. Pre-recorded performance 18 is played on VCR 55 for presentation on music video display 56 by means of video input 62. A studio musician, not shown, observes the performance of pre-recorded performance 18 on music video display 56 and operates studio synthesizer keyboard 58 to produce the desired tracks. It is expected that under most conditions, the studio musician will become familiar with pre-recorded performance 18 by observing one or more presentations thereof and then, while observing additional performances thereof, play the appropriate notes on studio synthesizer keyboard 58 to produce each individual track.

Studio synthesizer keyboard 58 is conveniently connected to specially configured microprocessor 60 which incorporates performance encoder 32 and musical note assistance data encoder 34 described above with respect to FIG. 1. Specially configured microprocessor 60 may conveniently be a conventional desk-top microcomputer including one or more additional plug-in cards to provide the functions described herein. In such a configuration, host computer memory 82 would likely be a part of the conventional portion of the desk-top computer while the remaining functions shown within microprocessor 60 in FIG. 2 would be included on one or more special purpose plug-in cards.

Video input 62 from VCR 55 is applied as the video input to microprocessor 60 as well as to music video display 56. Within microprocessor 60, video input 62 is applied to horizontal sync detector 66 which operates on the video signal to detect and synchronize with every horizontal scan line in the video signal. Video input 62 is also applied to vertical sync detector 68 which operates on the video signal to detect and synchronize with every vertical sync signal.

Each such vertical sync signal represents the beginning of a vertical blanking interval conventionally used to return the cathode ray raster scan to the top of the screen to begin the next frame of the video signal. Vert sync signal 70 at the output of vertical sync detector 68 is therefore applied to video frame counter 72 which is used to maintain an accurate count of the horizontal scan line in the video signal. The vertical sync signal may conveniently be detected by measuring the pulse width of the video signals because the vertical sync signal is provided by half-width pulses.

After the pulse width returns to normal, the vertical blanking interval or VBI begins. Within the VBI are a fixed number of VBI scan lines, often used to carry information not displayed in the video image, such as color or contrast or calibration information. In accordance with the present invention, a particular VBI scan line or lines is used to carry the musical note assist data. At the present time, there is no universally accepted standard for the use of particular VBI scan lines for particular data, so the following discussion will assume that the first VBI scan line will be the music data VBI scan line used for musical assist data. In any particular application, a different VBI scan line may be selected for this purpose.

Vert sync signal 70 from vertical sync detector 68 is applied to video frame counter 72, the output of which is applied to host computer memory 82. The output of video frame counter 72 represents the detection of the vertical sync signal so that the next horizontal sync signal detected thereafter represents the first VBI scan line which, as noted above, is selected as the music data VBI scan line for the purposes of this explanation. Other VBI scan lines may be selected in accordance with known techniques in the art.

Horizontal sync detect signal 74 from horizontal sync detector 66 is applied to VBI scan line locator 76 which receives vert sync signal 70 as its other input. The output of VBI scan line locator 76 represents detection of music data VBI scan line 78 which is applied to start data transfer switch 80.

The amount of music assist data to be applied to the video data may well exceed the data capacity of a single, or even a short series of, VBI scan lines used as music data VBI scan line 78. The notes being programmed are produced at a rate in the range of about 500 Khz. In addition, the data to be applied is stored in parallel form in host computer memory 82, as will be described in greater detail below. Start data transfer switch 80 is used to gate or control the operation of serial data adder 84 which is used to combine musical note assist data from host computer memory 82 with the video input so that the data is transferred serially for addition to the selected VBI scan line only during the interval of time when music data VBI scan line 78 is indicated to be present.

That is, during the detection of the selected horizontal scan line in the detected VBI, host computer memory 82 adds data in a serial fashion to video input 62 to produce musical note assistance data 48 which is applied, together with video input 62, as note assisted video 49 to note assisted master 86 by VCR 88. Playable mass media 20, discussed above with respect to FIG. 1, is made in a conventional manner by copying note assisted master 86.

Studio synthesizer keyboard 58, which may conveniently be part of performance encoder 32 discussed above with respect to FIG. 1, is used to provide MIDI input with keyboard track 40, melody line 42, chords 44, base line 46 and live drum track 26 if used. As noted above, these tracks are often produced in a serial fashion by a studio musician observing multiple renditions of pre-recorded performance 18 and are individually applied by MIDI output 92 to host computer memory 82 for storage. MIDI output 92 is combined with the frame count from video frame counter 72 in order to synchronize each track with pre-recorded performance 18 and therefore with each other.

In order to provide an accurate synchronization of the tracks and performance, conventional approaches may be used such as those employing the SMPTE format in which video frames are counted or a track is added to an audio tape in the form of a longitudinal tone track or LTT. In a preferred embodiment of the present invention, a signal is added to pre-recorded performance 18 on conventional master 54 for use as a master timing signal. One convenient manner in which this may done is to add an audio queue to the beginning of pre-recorded performance 18 by, for example, using the conventional audio dubbing input, not shown, of VCR 55. This audio queue may be applied by VCR audio 94 from VCR 55 to timing reference detector circuit 96 to produce master sync signal 98 which is then applied to host computer memory 82 along with the then current frame count.

In this manner, all video and music assistance data, such as tracks 40, 42, 44, 46 and 26 may all easily and accurately be synchronized together. Since these tracks are produced at different times by the studio musician, but must be added together synchronously by serial data adder 84 so that the music assistance data appears during the VBI scan lines in the appropriate video frames, accurate synchronization is important. By using master sync signal 98 at the beginning of the video tape and counting video frames thereafter, the music note assistance data from each track may conveniently and accurately combined with the data from the other tracks to form musical note assistance data 50 applied to ROM pack 24 or MIDI format musical note assistance data 52 applied to MIDI equipment 30.

Alternatively, the use of master sync signal 98 at the beginning of the video tape-and the counting of video frames thereafter-permits the music note assistance data from each track to be combined with the data from the other tracks and synchronized with the video performance to produce note assisted video 49 applied to note assisted master 86 by VCR 88. The format of musical note assistance data 48 may be varied in accordance with the particular application of this invention and/or the particular instrument to be enhanced by the music assistance data such as keyboard/strummer 10 shown in FIG. 1. The application of the music assistance data to the music data VBI scan line may be enhanced by use of a particular format for such data, which would appear on music data line 100 for application by serial data adder 84 to video input 62 under the control of start data transfer switch 80, as described below.

The presently preferred VBI data format includes the following six data items, each with the specified number of bits: <FLAG-1> <MELODY-1> <BASS-1> <CHORD-6> <SCALE-2> <PROGRAM-4>. A checksum follows each set of six data items for checking the accuracy of data transmission and reception of the data in a conventional manner.

With regard to <FLAG-1>, this is a single byte which signifies the presence or absence of data items, as follows:

| | |
|---|---|
| bit-7 | Always present |
| bit-6 | not presently used |
| bit-5 | not presently used |
| bit-4 | 4 program bytes |
| bit-3 | 2 scale bytes |
| bit 2 | 6 chord bytes |
| bit-1 | 1 bass note |
| bit-0 | 1 melody note. |

With regard to <MELODY-1>, this is a single byte of data indicating the current melody note utilizing the standard MIDI note numbering system. <MELODY-1> is the music assist data representing the melody line track laid down by the studio musician as melody line 42 shown in FIG. 1.

With regard to <BASS-1>, this is a single byte of data indicating the current bass note utilizing the standard MIDI note numbering system. <BASS-1> is the music assist data representing the bass line track laid down by the studio musician as base line 46 shown in FIG. 1.

With regard to <CHORD-6>, this is a set of 6 bytes of data representing the notes applied to each of the six vanes of strummer 38 of keyboard/strummer 10 shown in FIG. 1. <CHORD-6> is the music assist data representing the chord track laid down by the studio musician as chords 44 shown in FIG. 1.

With regard to <SCALE-2>, this is a set of two bytes. The first byte indicates the note assigned to the lowest key on keyboard section 36 of keyboard/strummer 10 as shown in FIG. 1. The second byte utilizes the fact that all musical scales are composed of a series of notes that have intervals of either one or two half-notes. The scale indication is therefore compressed to a single byte utilizing a zero bit to indicate a half-note and a one bit denoting a whole note interval. That is, the second byte is a series of bits in which the interval between the notes in the desired scale is indicated by the present or absence of a one in the bit location representing that note within the scale. <SCALE-2> is the music assist data representing the keyboard track laid down by the studio musician as keyboard track 40 as shown in FIG. 1.

With regard to <PROGRAM-4>, this set of four bytes of data indicates the instruments sound assignments for the melody, bass, chords and keyboard of the instrument to be programmed, such as keyboard/strummer 10 shown in FIG. 1.

The checksum is a single byte representing a 7 bit checksum of all other bytes in the format including <FLAG-1>.

Synchronization of the data is facilitated by the fact that only <FLAG-1> has bit-7 set so that the beginning of each series of data bytes in the format, that is the format frame, may easily be detected.

The format described above may be implemented on video data by using the two byte, 16 bit data length of a single VBI scan line by putting two bytes of data in each vertical blanking interval. In the worst case situation in which the most data was required, the data items representing <FLAG-1>, <MELODY-1>, <BASS-1>, <CHORD-6>, <SCALE-2>, and the checksum byte would require 1 plus 1 plus 1 plus 6 plus 2 plus 1 byte, respectively, for a total of twelve bytes. At 2 bytes of data per video blanking interval, assuming a data rate of about 500 Khz, six frames of video data would be required for the encoding of a complete set of such data. Each frame of video data represents 1/60 of a second, so the entire six frames of video data required for the encoding of the maximum required data in the format would only require 1/10 of a second of time. The music changes at a sufficiently slower rate than the video so that a complete change of all tracks of data within 1/10 of a second is sufficient.

The voicing of the instrument, that is, the voice program information provided by <PROGRAM-4> assigning instrument sounds to each of the four functions of the instrument would normally be sent only at the beginning of the performance in a configuration of data including only <FLAG-1>, <PROGRAM-4> and the checksum byte. This would require a total of only six bytes and would therefore only occupy three video frames extending for only 1/20 of a second.

Figure 3:
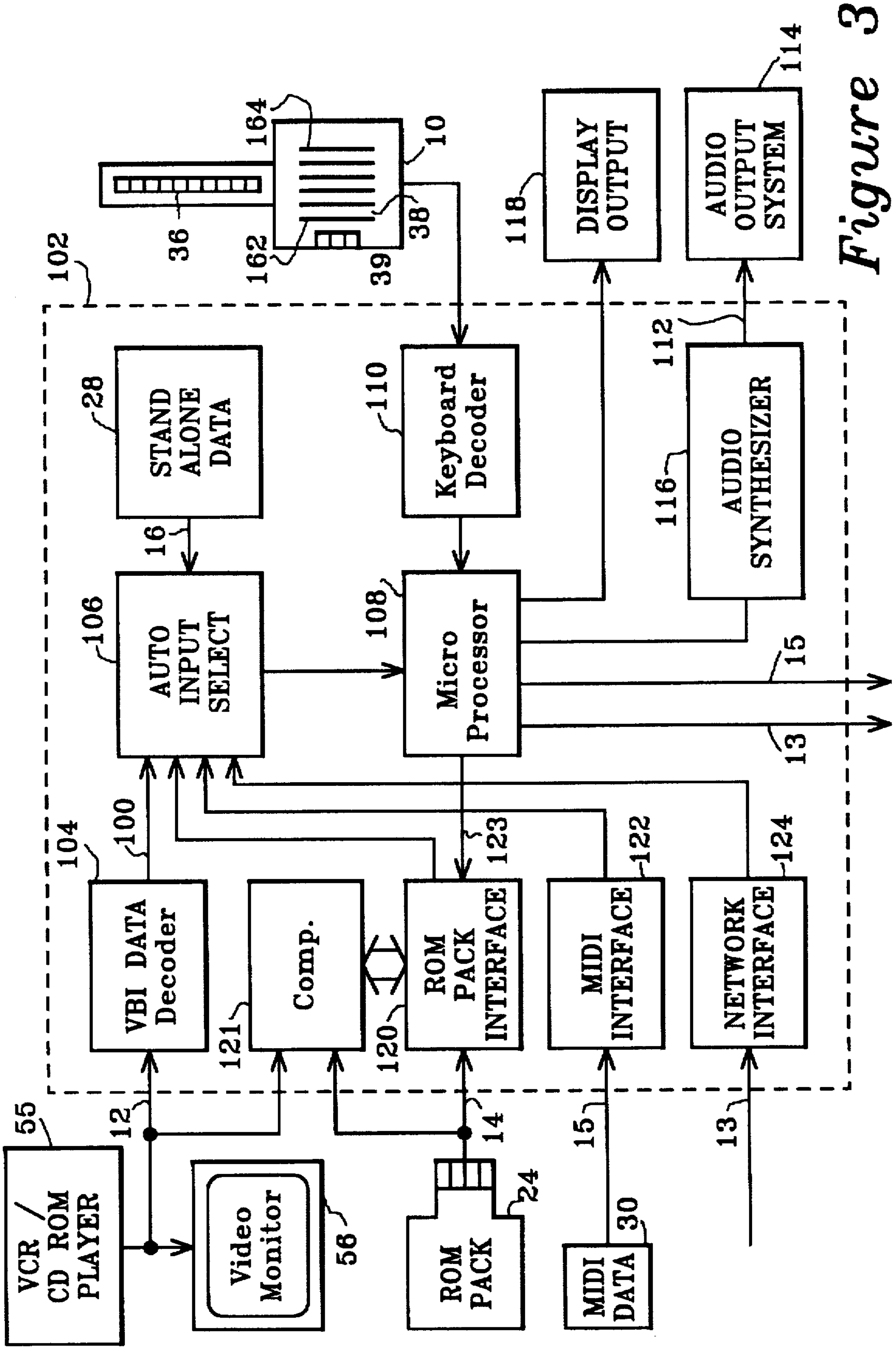
FIG. 3 is a block diagram illustrating the operation of the keyboard/strummer of FIGS. 1 and 2 in response to encoded musical note assistance data.

Referring now to FIG. 3, the following is a description of the operation of keyboard/strummer 10 shown in FIG. 1. As noted above, there are several modes in which keyboard/strummer 10 may be played by the student musician. For convenience of this explanation, the mass media mode in which the input to keyboard/strummer 10 is provided by mass media input 12 will be described first. In this mode, keyboard/strummer 10 is operated under the control of note assisted master 86 produced in accordance with the music note assistance encoding described above with respect to FIG. 2.

In particular, a note assisted video cassette, such as note assisted master 86 or a mass produced and distributed copy thereof, is inserted in an appropriate presentation device such as VCR 55, for display on music video display 56. Although the video and audio presentation of pre-recorded performance 18 may appear to the observer, such as a student musician, to be the same as pre-recorded performance 18 observed by the studio musician discussed above with respect to FIG. 2, the video output of VCR 55 is also used as mass media input 12 and includes musical note assistance data 48 encoded on one or more preselected VBI scan lines.

Mass media input 12 is therefore applied to the video input of music controller 102 which may conveniently be a specially configured computer board positioned physically within keyboard/strummer 10 or attached thereto. Music controller 102 may also be a conventional desk top microprocessor including various sound boards and other add-in cards necessary to perform the functions described below. Mass media input 12 is processed within music controller 102 by VBI data decoder 104 which serves to locate the preselected VBI scan line and extract the multiple bytes of music assistance data therefrom. The operation of VBI data decoder 104 to decode digital data from the VBI scan line is performed in much the same general manner as used to encode this digital data thereon by the cooperation of horizontal sync detector 66, vertical sync detector 68, VBI scan line locator 76, start data transfer switch 80 and serial data adder 84 in microprocessor 60, all as described above with respect to FIG. 2. VBI data decoder 104 thereby serves to decode or recover music data line 100.

Music data line 100 is applied to auto input selection switch 106 which merely serves to apply the appropriate music data input from mass media input 12, network input 13, specialized media input 14, MIDI data input 15 or stand alone programming input 16, to instrument microprocessor 108. In the mass media mode being described, auto input selection switch 106 applies music data line 100 from mass media input 12 to instrument microprocessor 108 which receives the output of keyboard decoder 110 as a second input. Keyboard decoder 110 is connected to keyboard/strummer 10 and provides data to instrument microprocessor 108 concerning the manner and timing of the activation of the input devices on keyboard decoder 110 by the student musician. The inputs provided by such activation will be described in greater detail below with respect to FIG. 4 but generally include the activation of function programming keys 39, keyboard section 36 and strummer 38.

Instrument microprocessor 108 generates audio output 112 applied to conventional audio output system 114 by audio synthesizer 116. Instrument microprocessor 108 may also provide a display output for the student musician on display output 118 which may conveniently be a conventional multi-line LCD or liquid crystal display. In addition, instrument microprocessor 108 simultaneously provides an output in the form of network input 13 for connection to another instrument as well as an output in the form of MIDI data input 15 for use by other MIDI equipment, not shown, for recording, mixing, audio output or similar purposes.

In the mass media mode just described, pre-recorded performance 18 is presented to the student musician on music video display 56 while the audio output produced by playing keyboard/strummer 10 is controlled by music data line 100 which has been synchronized with pre-recorded performance 18 as described above with respect to FIG. 2. In particular, at an appropriate point in pre-recorded performance 18, the studio musician may have used keyboard track 40 and chords 44 to change the music scale and the chord in accordance with the studio musician's musical appreciation of pre-recorded performance 18. These tracks would have been encoded by microprocessor 60 onto the appropriate VBI scan line at that same point of time in pre-recorded performance 18. When music data line 100 is decoded within instrument microprocessor 108, and activation of keyboard section 36 and strummer 38 by the student musician is decoded by keyboard decoder 110, the appropriate audio is produced by audio output system 114.

In a simple example, if the studio musician laid down keyboard and chord tracks appropriate for a C major scale and an F chord at the beginning of a second movement of the music, then when pre-recorded performance 18 displayed at the beginning of the second movement, activation by the student musician of any key in keyboard section 36 would be interpreted by instrument microprocessor 108 to produce a corresponding note in the C major scale and activation of strummer 38 would produce an F chord.

It should be noted, using this example for illustration, that if the student musician activated the wrong key, a different key within the C major scale would be produced. This result may be much less discordant than would otherwise result from the playing of a wrong note. Similarly, if the student musician did not activate a key at the proper time, no note would be produced.

Returning now to the various modes in which keyboard/strummer 10 may be operated, if ROM pack 24 is inserted into ROM pack interface 120, musical note assistance data would be applied to auto input selection switch 106 from specialized media input 14. ROM pack 24 therefore serves as a general purpose input/output or I/O port between microprocessor 60 and keyboard/strummer 10. ROM pack 24 may serve as an expansion slot for microprocessor 60 while physically resident in ROM pack interface 120 which as noted herein may conveniently be located within keyboard/strummer 10. ROM pack 24 may also conveniently be used for providing data for upgrades or changes to the operation of keyboard/strummer 10 such as by use in upgrading or changing the programming of instrument microprocessor 108.

ROM pack 24 may also be used in cooperation with other modes of operation of this system. For example, as noted above with respect to FIG. 1, playable mass media 20 may be any kind of such media including a CD ROM. It is potentially difficult and/or expensive to add musical note assistance data to a pre-published CD ROM. One alternative, however, is to provide the note assist data corresponding to the CD ROM on a selected corresponding ROM pack 24. In addition, the highly accurate timing and synchronization available with the digitized musical data on the pre-published CD ROM may be advantageously used to provide additional desirable benefits. For example, the first few bars or milliseconds of each track or song pre-recorded on the CD ROM, together with relative timing information indicating when that song is played may be recorded in a look up table or directory within ROM pack 24. Mass media input 12 and specialized media input 14 including this look up or directory data are applied to queuing comparator 121 which continuously compares data on mass media input 12 to determine correlation with the data stored in ROM pack 24 to determine which song is being played and when it starts.

If the mass media was a CD ROM, mass media player 55 would be a CD ROM player. Conventional CD ROM players often include the ability to select a particular track or song to be played. Queuing comparator 121 would then continuously compare the data stored within the look up table to the sound or music data provided by mass media input 12 to detect the beginning of a song. The beginning of a piece of music being played may then be identified by correlation with the data in the look up table or directory to identify the piece being played as well as the location within ROM pack 24 of the corresponding note assistance data. The output of queuing comparator 121 would then be applied to ROM pack interface 120 to select the appropriate note assist data corresponding to the piece being played.

The song mapping data in the music note assistance data in ROM pack 24 may therefore be synchronized with each song on a CD ROM. This is made possible by the very accurate and repeatable timing of each song played in a CD ROM, the fact that each copy of the same title of a CD ROM is identical to within about on part in 65,000 and the availability of accurate timing control by instrument microprocessor 108. In operation, keyboard/strummer 10 may therefore use data encoded on playable mass media 20, data encoded in ROM pack 24 synchronized with, and automatically queued, to match the song or track selected on playable mass media 20 or data available on ROM pack 24 that has been encoded from standardized music from other sources.

In addition, data from instrument microprocessor 108 may be added to ROM pack 24 before, during or after playing of keyboard/strummer 10. For example, the musician playing keyboard/strummer 10 may utilize musical note assistance data encoded for example on playable mass media 20 in the form of a video tape and make alterations or variations in the music produced by the manner in which the instrument is played. ROM pack 24 may include memory such as RAM which can be written to and then such variations may be preserved in ROM pack 24 by instrument microprocessor 108 by means of write back line 123. Many variations of the way in which the musical note assistance is encoded, recorded, modified and made available to the musician directly and/or by means of keyboard/strummer 10 are well within the skill of a person of ordinary skill in this art once the disclosure of the present invention has been made available.

If data from MIDI equipment 30 is applied via MIDI data input 15 to MIDI interface 122, then musical note assistance data would be applied to auto input selection switch 106 from MIDI data input 15. If data is applied by network input 13 to network interface 124, then musical note assistance data from network input 13 would be applied to auto input selection switch 106. In addition, stand alone instrument data 28 is applied by stand alone programming input 16 to auto input selection switch 106.

In this manner it can be seen that in particular applications, data from one or more inputs may be applied to auto input selection switch 106 simultaneously. Auto input selection switch 106 may therefore be pre-programmed to select from and/or combine the available data inputs in a desirable manner. For example, auto input selection switch 106 may be pre-programmed to treat the data available from the various inputs in a way reflecting the expected usage by the student player and therefore treat data from mass media input 12 as having the highest priority, network input 13 having the second priority followed by data from specialized media input 14 and then MIDI data input 15 with stand alone instrument data 28 from stand alone programming input 16 having the lowest priority. Various other combinations may be appropriate for different applications.

In operation of keyboard/strummer 10 in accordance with the present invention, the student musician activates a key or strummer input which is decoded by keyboard decoder 110 and applied to instrument microprocessor 108 which is programmed to respond to the actions of the musician in accordance with two different types of programming input data. The first type of programming data is the musical note assistance data discussed above.

The other type of data represents the action of the particular input mechanism. That is, the manner in which the keys of keyboard section 36 are played, or the manner in which the vanes of strummer 38 are strummed, is provided by keyboard decoder 110 to instrument microprocessor 108 and is used to control the music produced by audio output system 114. In a preferred embodiment, the speed of application and release of the force, the magnitude of the force and the position of the application of the force may all be used to input data to instrument microprocessor 108 to affect the music produced. In addition, the operation of instrument microprocessor 108 in the production of the musical output may be altered or adjusted by activation of one of the keys of function programming keys 39 to, for example, change the voice of the instrument.

Figure 5:
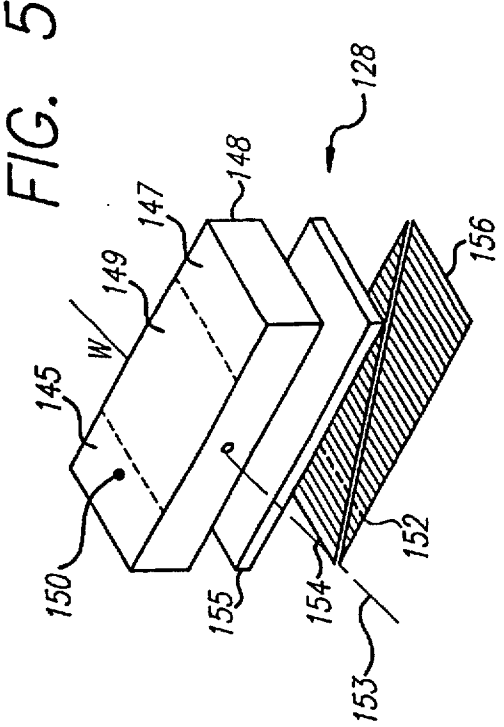
FIG. 5 is an exploded, isometric illustration of one of the key input assemblies of the keyboard portion of the keyboard/strummer depicted in FIGS. 1 through 3.
Figure 4:
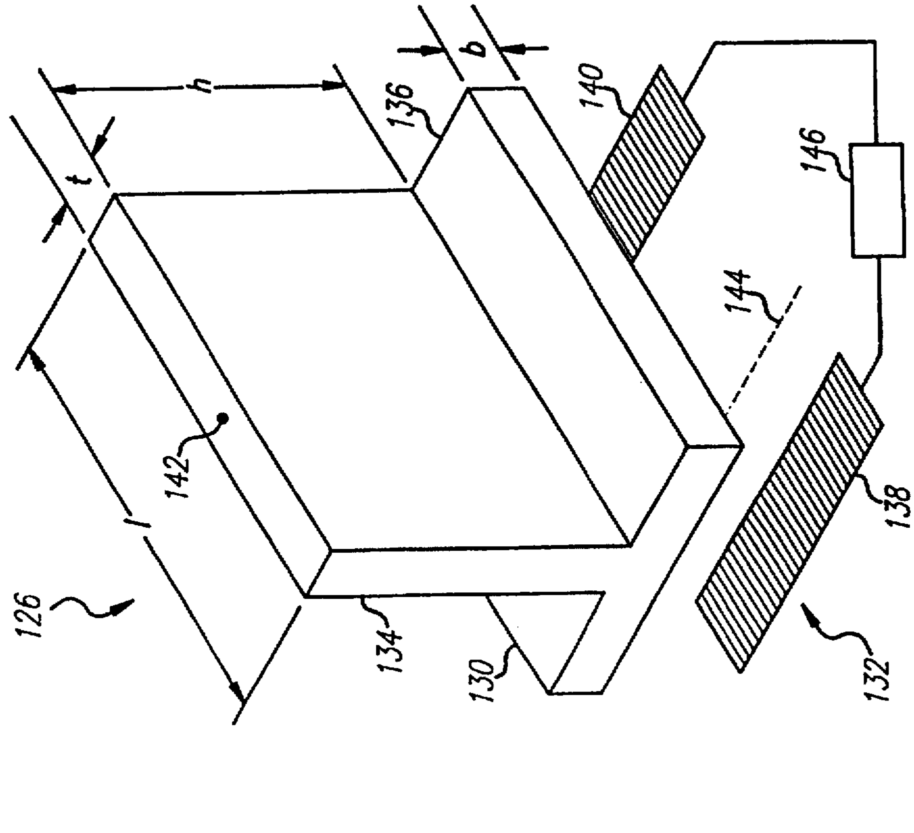
FIG. 4 is an exploded, isometric illustration of one of the six vane input assemblies of the strummer portion of the keyboard/strummer depicted in FIGS. 1 through 3.

The operation of keyboard section 36 and strummer 38 may be understood from the following more detailed description of vane input assembly 126 of strummer 38 shown in FIG. 4 and key input assembly 128 of keyboard section 36 shown in FIG. 5.

Referring now to FIG. 4, vane input assembly 126 is shown in an exploded view and is one of six identical vane assemblies which are combined to form strummer 38. Vane input assembly 126 may represent key vane 162 or 164 shown in FIG. 3 or any of the vanes therebetween. Vane 130 is a flexible, cantilever mounted inverted T shape made of an appropriately resilient material such as nylon. In a presently preferred embodiment, vane 130 has a length dimension '1' of about 6 inches, a thickness dimension 't' of about 0.03 inches, a height dimension 'h' of about 0.5" inches and a base dimension 'b' of about 0.3 inches.

Vane 130 is flexibly mounted above and in contact with sensor assembly 132 which is used to detect the manner is which vane extension 134 is physically activated by measuring the forces applied therefrom to vane mounting base 136 which is positioned in contact with sensor assembly 132. Sensor assembly 132 is a force and position sensor configured to detect the forces applied to vane extension 134 as well as to determine where, along length dimension '1', such forces were applied.

In addition to sensor assembly 132 sensing the activation of vane extension 134 by the musician, the mounting and materials used for vane extension 134 may provide a mechanical feedback or feel to the musician. That is, vane extension 134 is a torsion beam mounted in a cantilever fashion so that force is required to disturb the vane from its at rest position. The force varies with the distance from the rest position thereby providing a feel or touch feedback to the musician in a manner more consistent with original hand played instruments such as a guitar than is provided by music synthesizing instruments such as synthesizer keyboards.

In a preferred embodiment of the present invention, sensor assembly 132 is configured from a pair of force sensing resistors, called FSRs, such as rectangular FSRs 138 and 140 which are positioned in contact with opposite ends of the base of vane 130 as shown in FIG. 4. FSRs have the property that the resistance of the material changes in accordance with the force applied thereto and the surface area to which that force is applied. The FSRs are available in different configurations from Interlink Electronics of Carpinteria, Calif.

FSRs 138 and 140 are provided in a configuration in which the location of the force along the length dimension '1' is easily determined by comparison of the magnitudes of the forces applied to each such sensor. This determination is accomplished by force sensor decoder 146 which detects the total force applied to vane input assembly 126 as well as the relative portions of that force applied to each of FSRs 138 and 140.

In particular, a strumming force is applied to vane extension 134 at the position along length dimension '1' shown in FIG. 4 as strumming point 142 by the student musician by plucking, strumming or bowing vane input assembly 126. The resiliency of vane extension 134 and its mounting, not shown, permits the majority of the force applied to vane extension 134 at strumming point 142 to be translated and applied to sensor assembly 132 along strum force line 144. As seen in FIG. 4, FSRs 138 and 140 positioned in contact with opposite ends of vane mounting base 136.

At strum force line 144, the total force detected by force sensor decoder 146 is related to the sum of the forces detected by FSRs 138 and 140 while the relative position of strumming point 142 is detected by the relative magnitudes of the forces detected by each such FSR. As a simple example, it can easily be seen that a force applied to vane extension 134 near the end of sensor assembly 132 adjacent FSR 138 will result in almost all of the force being detected by FSR 138 while a force applied to vane extension 134 near the end of sensor assembly 132 adjacent FSR 140 will result in almost all of the force being detected by FSR 140. Similarly, a force applied to vane extension 134 in the middle of vane extension 134 would result in detection of approximately equal forces by FSRs 138 and 140. A force applied to strumming point 142 nearer to the end of vane extension 134 above FSR 138 and translated to strum force line 144 would therefore be detectable by the relatively larger force detected by FSR 138 and the relatively smaller force detected by FSR 138. In other applications, FSRs 138 and 140 may be configured differently to detect the applied forces differently.

Referring now to FIG. 5, key input assembly 128 operates in a manner similar to that described above with regard to vane input assembly 126 in that the force applied to key cap 148 at keystroke point 150 is translated to keystroke force line 152 by the flexible mounting of key cap 148, not shown. The magnitude of the force applied at keystroke point 150 is related to the sum of the forces detected by triangular shaped FSRs 154 and 156. The location of keystroke point 150 along width dimension 'w' of key cap 148 is determined by the magnitude of the force detected by FSR 154 compared to the magnitude of the force detected by FSR 156 at keystroke force line 152.

Triangular shaped FSRs 154 and 156 are generally symmetrical along an axis parallel with width dimension 'w' in a mirror image fashion. That is, at the end of key cap 148 shown nearest the base of triangular shaped FSR 154, triangular shaped FSR 154 has a substantially wider dimension parallel with width dimension 'w' than presented by triangular shaped FSR 156. Similarly, at the other end of key cap 148, triangular shaped FSR 156 has a substantially wider dimension parallel with width dimension 'w' than presented by triangular shaped FSR 154. The relative dimensions of the widths of triangular shaped FSRs 154 and 156 vary linearly along the axis of force sensor decoder 146 parallel with width dimension 'w'.

Triangular shaped FSRs 154 and 156 are shown as right isosceles triangles, normal to and mirror imaged about an axis parallel to width dimension 'w' so that a force applied to key cap 148 in the middle thereof would result in detection of approximately equal forces by triangular shaped FSRs 138 and 140. A force applied at keystroke force line 152 and translated to strum force line 152 would therefore be detectable by the larger force detected by triangular shaped FSR 154 and the relatively smaller force detected by triangular shaped FSR 156. In other applications, FSRs 154 and 156 may be configured differently to detect the applied forces differently. In the example shown, the width dimensions of triangular shaped FSRs 154 and 156 vary linearly with position. In other applications, it may be desirable for the width dimensions to vary non-linearly, such as in a logarithmic fashion, to suit the information to be detected by the FSRs.

In addition, force spreading pad 155 may be positioned between key cap 148 and triangular shaped FSRs 154 and 156 to diffuse and spread the force applied to key cap 148 for better detection by FSRs 154 and 156. A similar force spreading pad, not shown, may be used between vane mounting base 136 and sensor assembly 132 of FIG. 4 and/or with the alternate FSR configuration shown and described below in greater detail with respect to FIG. 7. Force spreading pad 155 may be fabricated from any suitable material, such as urethane rubber which is available from Rogers International of Rogers, Conn. under the trademark "PORON".

Figure 6:
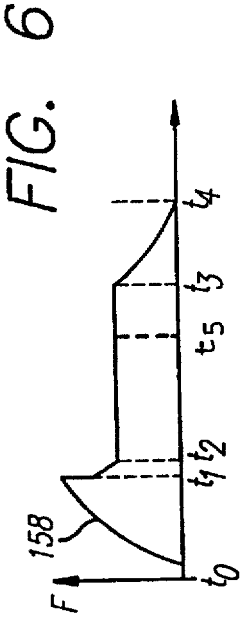
FIG. 6 is a graphical illustration of the effects of activating the keyboard inputs of the keyboard/strummer depicted in FIGS. 1 through 3.

Referring now to FIG. 6, graph 158 depicts the force applied to key cap 148, shown in FIG. 5, as a function of time for a key activation applied thereto at any position along width dimension 'w'. The initial period of time from t0 to t1 is known as the attack and represents the speed at which the force is increased as well as the magnitude of the force. In musical instruments, it is conventional to alter the sound volume produced in accordance with the velocity of the attack. That is, if key input assembly 128 is actuated briskly, instrument microprocessor 108 may conveniently be programmed to set the volume of the sound produced by actuation of this key to be louder than if the key is stroked gently. This is typical, for example, in piano voiced instruments.

The second period, from t1 to t2 is known as the decay in which the loudness of the initial response to the activation of the key decreases to a level indicated by the time period from t2 to t3, known as the sustain. During the sustain, the note is held, but at a lower volume than indicated by the speed of the attack. During the sustain period, the force applied may be varied to produce the musical effect known as after-touch in which the musical quality of the note produced may be varied in accordance with variations of the force with which the key is held before release.

From time t3 to t4, the force applied to key cap 148 is removed. In accordance with the present invention, instrument microprocessor 108 may be programmed to determine the speed of release as an additional piece of musical data, similar to the speed of the attack. The speed of release may easily be determined quickly and used to alter the music produced at the end of the sustain period. For example, in playing a first note, the musician striking key cap 148 may choose to attack briskly and release briskly. Instrument microprocessor 108 may then conveniently be programmed to produce a note which is both relatively loud and which stops abruptly at the end of the sustain as is normally the case in conventional instruments.

In particular, in accordance with the present invention, the manner in which the key is released is also available for changing the way in which the note is produced. That is, if key cap 148 is attacked briskly but released slowly, the slow release may result in an altered-release musical effect such as reverberation. Alternatively, other musical effects may be controlled by the manner of the release, including tremolo or other effects. It is important to note that the manner in which the release occurs is used to control the musical quality during the period immediately subsequent to that release.

In addition to controlling musical qualities such as loudness, sustain, reverberation, tremolo and etc. by controlling the speed of attack, length of application of force and the speed of release, the musician may also control the tone of the note produced by the initial and subsequent locations on the keys to which force is applied. Bending graph 160 is an illustration of the effects of various application forces applied to key cap 148. Sweetspot 149 in the center section of keycap 148, as shown in FIG. 5, is designated as a "sweetspot" in which the note produced is exactly the note selected by the musical note assist data without regard to the level of force applied to keycap 148.

Outboard of sweetspot 149, however, the force applied to keycap 148 may be used to modify the note produced. When the force applied to outboard areas 145 or 147, on either side of sweetspot 149, is below first force threshold level FT1, these outboard areas operate in the same manner as sweetspot 149. That is, when a force below FT1 is applied to outboard areas 145 or 147, the note produced is the same as the note that would be produced if sweetspot 149 were activated. Similarly, if a force above second force threshold level FT2 is applied to one of the outboard areas, the note produced is the same as the note that would be produced if sweetspot 149 were activated. That is, if key cap 148 is activated in sweetspot 149 at any level of detectable force or in outboard areas 145 or 147 at force levels below FT1 or above FT2, the note preprogrammed by the note assist data will be produced.

In accordance with the present invention, however, if force is applied to outboard areas 145 or 147 at a level between first and second force threshold levels FT1 and FT2, the tone of note produce will be changed or bent. Both FT1 and FT2 are programmable levels and the range of maximum tonal change resulting from the application of a force at just below second force threshold level FT2 is also programmable. The change of tone may be further changed by the changing position of the application of the force and/or changing the magnitude of the force.

Figure 7:
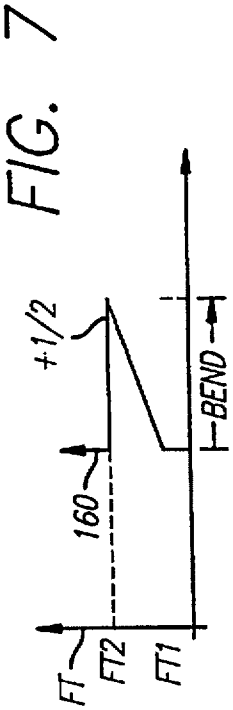
FIG. 7 is a graphical illustration of the force thresholds associated with activating the keys of the keyboard inputs outboard of the central sweetspot.

Referring now to FIG. 7, one convenient arrangement is illustrated by bending graph 160 in which a force at about the second force threshold level FT2 applied to the furthest outboard edge of outboard area 147 causes the tone of the note produced to be increased by half a step. Similarly, a force at about the second force threshold level FT2 applied to the furthest outboard edge of outboard area 145 would be programmed to cause the tone of the note produced to be decreased by half a step. In both instances, a force originally applied to either outboard areas 145 or 147 between first and second force threshold levels FT1 and FT2 would produce a note shifted from the sweetspot note in relationship to the displacement of the position of the application of the force from the sweetspot. Further, if the displacement of that force is changed during the application of the force to key cap 148, the tone would be bent, that is, the tone would change in accordance with the changing displacement.

In other words, striking the key softly or sharply will play the programmed note, while striking the key within the force thresholds but outside of the sweetspot allows the note to be bent or changed. If the key is struck within the force thresholds near the sweetspot and then moved toward the furthest end of outboard area 147, the tone would change from the preprogrammed note to a note one half step up, in the same manner as graphically illustrated in FIG. 7.

By selectively stroking key cap 148 at one end or the other, the note played may therefore be chromatically shifted up or down one half tone. By sliding the point of application of the force to key cap 148 during the stroking of the key, the tone may be continuously chromatically shifted or bent from one half step down through on half step up.

In an alternate embodiment, the bending and chromatic shifting is handled in a different manner. In this approach, the initial point of contact with the key determines whether bending or a chromatic shift may occur. If key cap 148 is first touched in sweetspot 149, the tone produced will be the preprogrammed tone. Moving the point of application out of sweetspot 149 to outboard areas 145 or 147 will cause the tone to bend up or down, respectively. The amount of bending, that is, the change in tone, is a function of force so that the tone may be bent more or less by applying more or less pressure to key cap 148.

In this approach, chromatic shifts occur if key cap 148 is first struck outside sweetspot 149 in outboard areas 145 or 147. For example, by striking outboard area 145 first, the tone produced may be shifted chromatically up one half step while first striking outboard area 147 would result in a tone shifted chromatically down by one half step. In this embodiment, the volume of the chromatically shifted tone is a function of the pressure applied just as it is for the sweetspot tone.

Referring now again to FIG. 4, vane input assembly 126 may be played by the musician differently than key input assembly 128 of FIG. 5. To better represent the sounds produced by the plucked strings of a guitar, for example, strummer 38 may be interpreted by instrument microprocessor 108 to produce the appropriate musical note in accordance with the musical note assistance data only when vane extension 134 is released. That is, the musician plucks vane extension 134 at strumming point 142 but no music is produced until the vane is released. The loudness, or another musical quality, may then conveniently be determined by instrument microprocessor 108 from the speed of the attack or the total magnitude of the force applied. That is, if vane extension 134 is moved from the at rest position only a relatively small distance, when released the music produced thereby may be at a relatively low volume. If, however, vane extension 134 is moved a much larger distance from its at rest position before release, the volume of the chord produced may be significantly louder.

There are several other ways in which strummer 38 may be utilized in a different manner than keyboard section 36. In addition to producing the note only when released, strummer 38 is programmed by the musical note assistance data to produce a cord of six notes so that keyboard/strummer 10 may be set up by function programming keys 39 to require each chord note to be played by plucking the appropriate vane for each chord note or by providing a key vane, such as key vane 162 shown in FIG. 3, which is used to activate the entire chord. That is, instrument microprocessor 108 may be programmed by activation of selected keys in function programming keys 39 so that plucking key vane 162 automatically produces the entire chord. Similarly, function programming keys 39 may be used to alter the position of the key vane from key vane 162 to key vane 164 as also shown in FIG. 3, so that keyboard/strummer 10 may easily be converted from a right handed to a left handed instrument.

Additionally, the position along length dimension 'l' at which the vane activation force is applied may be used to alter the musical qualities of the chords produced in the same manner that the stroking of key cap 148 of FIG. 5 along width dimension 'w' is used to bend the note produced. The musical quality affected by the positioning along length dimension 'l' of strumming point 142 may be selected by function programming keys 39 to be bending of the note, loudness, sustain, after-touch qualities or any other musical quality controllable by instrument microprocessor 108 in the production of music from audio output system 114 of FIG. 3.

Alternatively, instrument microprocessor 108 may be programmed to respond to bowing of strummer 38 by a bow, not shown, in the manner that a violin is played by bowing.

In another embodiment, a particular mode such as the bowing mode, may operate in a different manner. That is, rather than having the tone produced only when the displaced vane is released and the volume of the tone produced being controlled by the magnitude of the displacement of the vane, the vane may be operated in a manner similar to the keys. That is, pressure on each vane will produce a tone or chord directly upon application, rather than release, with the volume a function of the magnitude of the pressure. Multimode operations are also convenient so that chromatic shifts, tone bending or other musical effects may be controlled by the position or change in position of the application of the force, as desired.

For example, while playing a conventional guitar, it is common practice to pluck one or more strings to produce a chord and rest the pick or musician's finger on the next string without playing it. This effect may easily be simulated by programming instrument microprocessor 108 so that displacement or pressure or speed of application or speed of release may be used to set a threshold for operation of a vane. For example, if the speed of release of a vane is below a programmable threshold, release of the vane may be programmed to not produce a chord or tone so that the vane may be used as a rest without producing an unwanted note.

An additional difference in the manner in which keyboard section 36 and strummer 38 may be operated is related to the timing of the activation of the input devices as described above for example with regard to FIG. 6. That is, by changing the position along width dimension 'w' of key cap 148 of FIG. 5, the tone of the note being played may be bent. In this way, the note is altered during playing. When strummer 38 is configured by instrument microprocessor 108 to begin playing the note when released, some alteration of the note qualities is under the control of the musician before release of the vane. In addition, the chords being played may also be muted by the musician by touching the vanes after release. That is, the musician may pluck the key vane to play the chord encoded by the musical note assistance data and then, before the end of the sustain, the musician may place his or her hand on the vanes of the strummer to prematurely stop or otherwise modify the playing of the chord.

Figure 8:
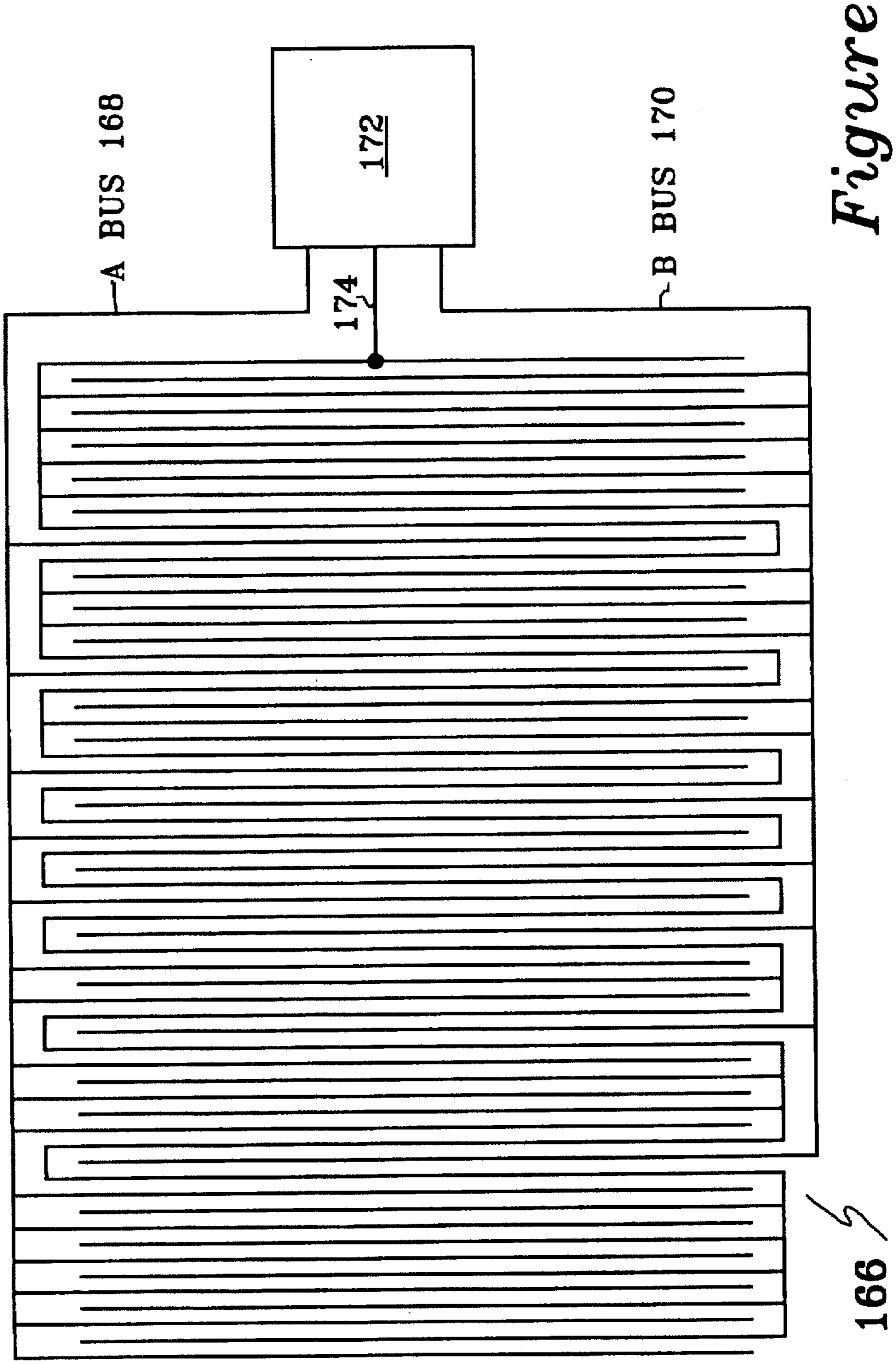
FIG. 8 is a schematic representation of a stepped FSR in accordance with the present invention.

Referring now to FIG. 8, a particularly convenient form of FSR, for use for example with key input assembly 128 of FIG. 5, is shown in schematic form as stepped FSR layout 166 which is formed of conductive tracing material on a suitable insulating substrate in the manner available from Interlink Electronics of Carpinteria, Calif. as noted above. Stepped FSR layout 166 includes a first or "A" bus trace 168 and a second or "B" bus trace 170 both of which are interlaced as shown in the figure and connected by sensor driver/detector 172.

In conventional operation of stepped FSRs, a voltage would be applied to a central line, such as read line 174 shown in FIG. 8, and the voltages appearing on "A" bus trace 168 and "B" bus trace 170 would be measured by sensor driver/detector 172. The voltages appearing on the busses would therefore depend upon FSR resistance as changed by the pressure applied. Thereafter, the pressure applied and the location of its application would be determined by computation, usually in separate steps.

In accordance with a preferred embodiment of the present invention, however, sensor driver/detector 172 may operate in a different mode in which voltage are applied, during two different steps, to the busses while the voltage appearing on read line 174 in during one such step represents position and during the other step represents a force measurement.

In the position determining step or mode, substantially different voltages are applied to "A" bus trace 168 and "B" bus trace 170 such as by applying a fixed, convenient voltage to "A" bus trace 168 and grounding "B" bus trace 170. In addition, a relatively high fixed resistance is provided between read line 174 and one of the buses, such as "B" bus trace 170. When force is then applied somewhere along key cap 148, read line 174 becomes the wiper or central voltage of a resistor divider network one leg of which is the fixed resistance while the other leg is the resistance of the FSR. In this mode, the force is translated directly into changes in the magnitude of the resistance based on the interlaced pattern of "A" bus trace 168, "B" bus trace 170 and read line 174 without regard to the magnitude of the force. That is, the further towards the left as shown in the drawing that the force is applied, the greater the affect of the voltage applied to "A" bus trace 168 on read line 174 and therefore the position along key cap 148 at which this force is applied is easily determined as a ratio of the detected voltage to the voltage applied to "A" bus trace 168. That is, if the relative magnitude of the bus voltages and fixed resistance are properly selected, the voltage appearing on read line 174 will be primarily indicative of position without regard to the magnitude of the force.

On the other hand, in the force only step or mode which may conveniently be operated alternately with the position only mode, sensor driver/detector 172 operates to connect "A" bus trace 168 directly to "B" bus trace 170, applying a common voltage to both and effectively reducing stepped FSR layout 166 to a single bus pattern. When force is then applied along key cap 148, the magnitude of the resistance exhibited by the single FSR trace may easily be measure as an indication of the magnitude of the force applied, independently of the position along key cap 148 where that force was applied.

Sensor driver/detector 172 may be used to alternate stepped FSR layout 166 in between the pressure and position only steps or modes to conveniently provide the information required by instrument microprocessor 108 to which sensor driver/detector 172 is connected by keyboard decoder 110, shown in FIG. 3.

What is claimed is:

1. An electronic musical instrument system, comprising:

musical performance means for reproducing at least a portion of a performance of a pre-recorded musical piece having a series of notes and/or chords;

pitch data means for providing a series of individual note and/or chord pitch data, each one of the series of individual pitch data being related in pitch and order of occurrence to a corresponding one of the series of notes and/or chords of the pre-recorded musical piece;

a plurality of electronic musical instrument input members operable by a player;

means for sequentially mapping the series of pitch data to each of the input members; and means, responsive to actuation of the input members by the player, individually or in combination, in a sequence, of a duration, and at time intervals selected by the player, for producing a personalized series of individual notes and/or chords related to the performance of the pre-recorded musical piece at the time of actuation by generating an individual note and/or chord in response to actuation of one of the plurality of input members, the generated individual note and/or chord being related to the performance of the pre-recorded musical piece at the time of actuation of the one input member to produce a personalized version of the pre-recorded musical piece that is musically compatible with the pre-recorded musical piece at the time of actuation.

2. The system of claim 1 wherein the means responsive to the actuation of the input members further comprises:

means for producing each of the personalized series of individual notes and/or chords in accordance with the timing of each actuation of the input members.

3. The system of claim 2 wherein the means responsive to the actuation of the input members further comprises:

a volume control circuit to control the volume of each of the personalized series of individual notes and/or chords in accordance with the manner of actuation of each actuation of the input members by the player.

4. The system of claim 1 wherein the musical performance means reproduces all portions of the pre-recorded musical piece to permit the player to play along with the pre-recorded musical piece by actuation of the input members.

5. The system of claim 4 wherein the musical performance means further comprises:

storage media for storing and reproducing a recording of the pre-recorded musical piece.

6. The system of claim 5 wherein said pitch data means further comprises:

means responsive to the performance of the pre-recorded musical piece by the storage media for deriving the pitch data therefrom.

7. The system of claim 6 wherein the pitch data is intermingled with the recording of the musical piece on the storage media.

8. The system of claim 7 wherein the storage media is a video medium having frames of video data separated by vertical blanking intervals and the pitch data is encoded within the vertical blanking intervals.

9. The system of claim 6 wherein the storage media is a digital audio recording of the pre-recording musical piece including the pitch data.

10. The system of claim 1 further comprising:

selection means for selecting the portions of the pre-recorded musical piece to be reproduced by the musical performance means so that the musician can actuate the input members to produce a personalized series of notes and/or chords related to other portions of the pre-recorded musical piece.

11. The system of claim 10 further comprising:

digital data storage means for storing data related to the pre-recorded musical piece for reproducing the selected portions of the performance and for providing pitch date for the other portions of the performance.

12. An electronic musical instrument system for producing a performance of a pre-recorded musical piece having a series of notes and/or chords modified by a player of the system to produce an individualized musical performance, the system comprising:

a musical performance device for reproducing the performance of the pre-recorded musical piece;

a data storage area containing data related to the series of individual notes and/or chords of the pre-recorded musical piece, said stored data being related in pitch and order of occurrence to the series of notes and/or chords of the pre-recorded musical piece;

a plurality of electronic musical instrument input members operable by the player to produce player input signals;

a mapping circuit coupled to said storage area and to said input members to sequentially map said stored data to each of said player input signals; and a music production device, responsive to actuation of said input members by the player, individually or in combination, in a sequence, of a duration, and at time intervals selected by the player, to produce the individualized musical performance by generating an individual note and/or chord in response to actuation of one of said input members by the player, said generated individual note and/or chord being related to the performance of the pre-recorded musical piece at the time of actuation of said one input member so that multiple actuations result in the production of a musical element that is individualized to the player and which is musically compatible with the pre-recorded musical piece to produce a personalized version of the pre-recorded musical piece.

13. The system of claim 12 wherein said music production device generates said individual note and/or chord at a selected volume level, the system further including a force sensing circuit coupled to at least a portion of said input members to sense an activation force of said portion of input members, said music production device altering said selected volume to correspond to said sensed activation force.

14. The system of claim 12 wherein said data storage area comprises a video storage device.

15. The system of claim 14 wherein said video storage device stores the pre-recorded musical piece and said stored data.

16. The system of claim 14 wherein said video storage device stores a video signal and video synchronization signals, said stored data being stored in a vertical blanking interval in said video synchronization signals.

17. The system of claim 12 wherein said data storage area comprises a digital audio recording media.

18. The system of claim 17 wherein said digital audio recording media stores the pre-recorded musical piece and said stored data.

19. The system of claim 12 wherein the pre-recorded musical piece includes a plurality of musical portions, the system further including an input selector to select at least one of said plurality of musical portions to be reproduced by said musical performance device.

20. The system of claim 19 further including a digital storage area to store reproduction data for use by said musical performance device to reproduce said selected musical portion.

21. A computer readable media for producing a performance of a pre-recorded musical piece having a series of notes and/or chords modified by a player of the system to produce an individualized musical performance, the computer readable media comprising computer instructions that cause the computer to perform the steps of:

using a musical performance device for reproducing the performance of the pre-recorded musical piece;

storing data related to the series of individual notes and/or chords of the pre-recorded musical piece, said stored data being related in pitch and order of occurrence to the series of notes and/or chords of the pre-recorded musical piece;

sensing actuation of a plurality of electronic musical instrument input members operable by the player, each producing a player input signal in response to actuation of each of said input members by the player;

mapping said stored data to each of said plurality of said input members; and responding to said mapped data and said actuation of said input members by the player, individually or in combination, in a sequence, of a duration, and at time intervals selected by the player, to produce the individualized musical performance by generating an individual note and/or chord in response to actuation of one of said input members by the player, said generated individual note and/or chord being related to the performance of the pre-recorded musical piece at the time of actuation of said one input member so that multiple actuations result in the production of a musical element that is individualized to the player and which is musically compatible with the pre-recorded musical piece to produce a personalized version of the pre-recorded musical piece.

22. A method for producing a performance of a pre-recorded musical piece having a series of notes and/or chords modified by a player of the system to produce an individualized musical performance, the method comprising the steps of:

using a musical performance device for reproducing the performance of the pre-recorded musical piece;

storing data related to the series of individual notes and/or chords of the pre-recorded musical piece, said stored data being related in pitch and order of occurrence to the series of notes and/or chords of the pre-recorded musical piece;

sensing actuation of a plurality of electronic musical instrument input members operable by the player, each producing a player input signal in response to actuation of each of said input members by the player;

mapping said stored data to each of said plurality of said input members; and responding to said mapped data and said actuation of said input members by the player, individually or in combination, in a sequence, of a duration, and at time intervals selected by the player, to produce the individualized musical performance by generating an individual note and/or chord in response to actuation of one of said input members by the player, said generated individual note and/or chord being related to the performance of the pre-recorded musical piece at the time of actuation of said one input member so that multiple actuations result in the production of a musical element that is individualized to the player and which is musically compatible with the pre-recorded musical piece to produce a personalized version of the pre-recorded musical piece.

* * * * *